June 13, 1939.   G. A. TINNERMAN   2,162,652
FASTENER
Original Filed Oct. 12, 1937
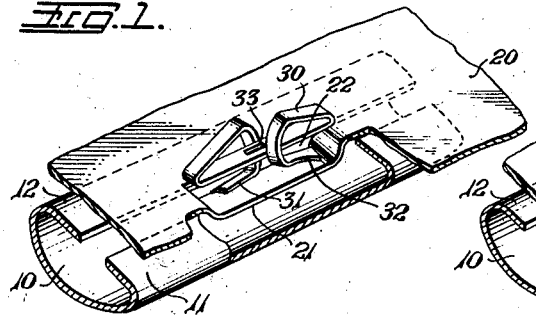
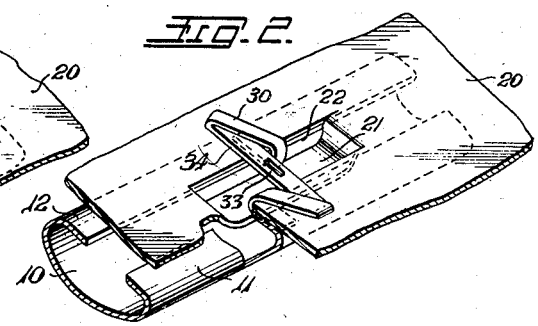
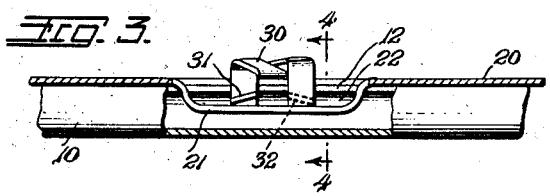
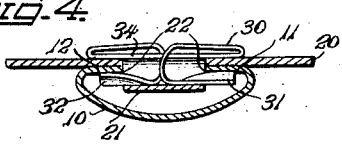
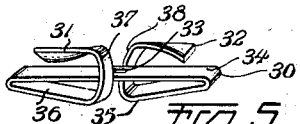
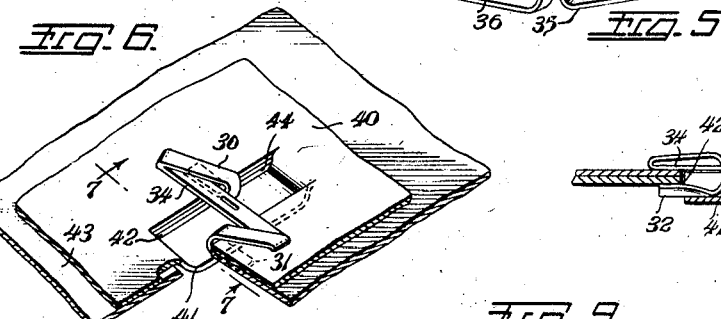
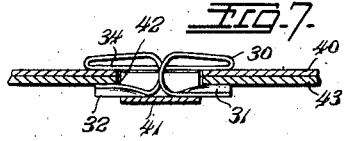
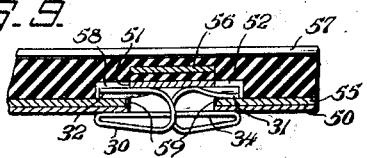
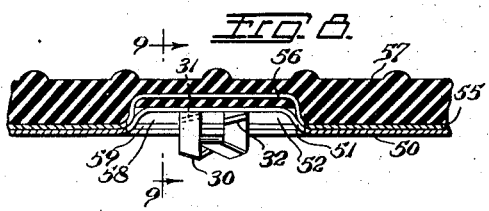
Inventor:
GEORGE A. TINNERMAN
Attorney Patented June 13, 1939

2,162,652

UNITED STATES PATENT OFFICE 2,162,652

FASTENER

George A. Tinnerman, Rocky River, Ohio, assignor to Albert H. Tinnerman, Cleveland, Ohio Original application October 12, 1937, Serial No. 168,673, now Patent No. 2,140,887, dated December 20, 1938. Divided and this application December 13, 1938, Serial No. 245,471

6 Claims. (Cl. 24—221)

This invention relates to molding constructions or similar installations in which a member is mounted in fixed relation on a cooperating supporting member and secured by spring clips, and the like. The present application is directed to a preferred form of clip fastening per se employed in such installations and is a division of prior copending application Serial Number 168,673, filed October 12, 1937, and since issued as Patent Number 2,140,887, December 20, 1938.

More particularly, this invention deals with improved constructions for fastening cooperating members of an installation embodying substantial interengaging retainer means rigidifying and preventing displacement thereof in assembled relation together with an improved spring clip fastening device positively securing the members in an assembled relation.

A primary object of the invention is to provide a spring clip fastening of this character which is designed to exert a substantial cam tightening action in securing the cooperating members in assembled relation under continuously effective spring tension.

Another object of the invention is to provide a spring clip fastening constructed of a small inexpensive strip of metal having bent sections on either side of the mid-portion thereof providing yieldable camming hook elements which may be rotated to applied position to fasten the members secured under progressively increasing force in a substantial screw-tightening action.

Still another object is to provide a one-piece clip fastening comprising a base and yieldable head sections carrying substantial camming hook elements which are effective upon rotation of the fastener to applied position to draw the members secured toward close rigid engagement in a completed installation.

Further objects and advantages, and other new and useful features in the construction, arrangement and general combination of parts of the invention will be readily apparent to those skilled in the art as a description thereof proceeds with reference to the accompanying drawing in which like reference characters designate like parts throughout the same, and in which:

Fig. 1 is a fragmentary perspective of a molding as assembled with a supporting member provided with a retainer element, and showing a clip device about to be applied for securing the members in assembled relation;

Fig. 2 is a similar view showing the clip device as rotated substantially ninety degrees to locked fastening engagement securing the members;

Fig. 3 is an edge elevation of Fig. 1, parts of the molding being broken away to show the assembled engagement of the molding with the retainer of the supporting member together with elements of the clip cooperating with the retainer in locking fastening position;

Fig. 4 is a section taken on line 4—4 of Fig. 3;

Fig. 5 is a perspective of the clip per se;

Fig. 6 shows a further embodiment of the invention in which the retainer provided in a member to be mounted is assembled in an aperture in a cooperating supporting member to prevent displacement and relative shifting movement thereof, the spring clip means being shown as cooperating with the retainer to lock in position thereby positively securing the members in assembled relation;

Fig. 7 is a section taken on line 7—7 of Fig. 6;

Fig. 8 shows another embodiment of the invention in which retainer means are utilized for securing an assembly comprising a member including an initially plastic part such as a rubber mat or tread, and in which the spring clip, securing such part to the supporting member, is applied through the opening from which a cooperating retainer element is struck and formed; and, Fig. 9 is a vertical section taken on line 9—9 of the installation illustrated in Fig. 8 showing retainer means as employed as a concealed reinforcing element for the member including the plastic part secured to the supporting member by the spring clip.

In general, the present invention contemplates an installation in which a member is provided with a retainer element adapted to minimize displacement and rigidify the assembly thereof with a cooperating member mounted thereon, and secured by spring clip devices, or the like. In the provision of the retainer element there is necessarily presented an opening through which securing means, such as rotary clips, may be applied from the accessible side of the opening opposite to that on which the retainer is disposed to engage in an aligned opening in a cooperating member to positively secure the members in assembled relation. Preferably the retainer elements are provided on the inner, concealed face of the supporting member and are so designed as to snugly fit in cooperating openings in the member to be mounted. Thus, a retainer element serves as a means facilitating assembly of the members, prevents displacement or shifting movement thereof from assembled relation, and also provides an opening on the outer, exposed face of the supporting member through which rotary spring clip securing means, or the like, may be applied to fastening position and, if desired into locked fastening engagement with the retainer element such that the installation is tight and rigid throughout with little tendency to loosen from applied positon due to vibration, jarring and strain such as, for example, takes place in an automobile installation.

In securing superposed members having substantially aligned openings readily accessible from one side only, various forms of rotary clip devices have heretofore been employed extensively as the securing means and these installations are now well known. However, without exception, in these prior installations the clip devices alone serve as the securing means and, in many instances, though in proper fastening position do not rigidly retain the assembled members against displacement such that, most often, upon relative shifting movement of the assembled members due to vibration, the securing devices are caused to work loose and become removed from applied fastening position thereby resulting in an inefficient installation and in which the securing devices are practically useless.

In contrast to such constructions, the instant invention provides an arrangement embodying a retainer element by which the assembled members are positively held in assembled relation without possibility of displacement or shifting movement such that much of the strain incident to vibration is removed from the clip devices whereby the same are not subject to loosening or removal from applied fastening position rigidly securing the members in an installation.

Referring now more particularly to the drawing, Figs. 1-4 inclusive show the invention as embodied in a molding construction in which the molding member is generally designated 10, the supporting member 20 and the spring clip securing means 30. The supporting member 20 is provided with a retainer of any suitable outline, but preferably, comprises a substantially rectangular element obtained by slitting and forming an area of the supporting member out of its plane thereby providing a substantial loop 21 spaced at its longitudinal edges from the supporting member as at 22 and presenting an opening at the outer exposed face of the supporting member 20 through which the spring clip securing means may be applied. Any desired number of such retainer elements are provided in the supporting member and positioned according to the manner in which the molding extends throughout the length thereof. The molding may then be assembled to the supporting member with the retainer elements, projecting therefrom, seated in the interior of the molding 10 between the opposed longitudinal edges of the base flanges 11, 12 thereof substantially as shown in Figs. 2 and 3. A rotary spring clip 30 having preferably camming hook elements 31, 32, depending from the legs thereof, is then applied to the substantially rectangular opening in the supporting member with the leading cam edges of said hook elements 31, 32 disposed in the elongated spaces 22, intermediate the retainer 21 and base flanges 11, 12 of the molding substantially as shown in Fig. 1. The fastener may then be rotated by the use of a tool such as, for instance, a screw driver which fits into a tool receiving slot 33 provided lengthwise of the body portion 34 of the clip as hereinafter set forth. Upon rotation of the spring clip substantially ninety degrees into the position of locked fastening engagement shown in Fig. 2, the inclined camming surfaces of the hook elements 31, 32 of the clip engage the base flanges of the molding with progressively increasing force and thereby act as camming elements to draw the parts together in what may be termed a screw tightening action. Preparatory to the turning operation the inclined hook elements 31, 32 will necessarily seat on the retainer element in operative position to slots 22 above described, such that when the clip is turned to its ultimate fastening position, the said hooks not only engage the base flanges of the molding to rigidly secure the same to the supporting member, but also, if so designed, frictionally engage the adjacent straight faces of the retainer element thereby locking the clip in applied fastening position substantially as shown in Fig. 4.

The installation of the molding and supporting member thus effected is a firm, rigid and lasting one and, as stated, the retainer elements provided in the supporting member for cooperative engagement with the base flanges of the molding retain the same against displacement and prevent loosening or shifting of the assembly incident to vibration, jarring and strain. In this respect the spring clips securing the members in the installation are not subject to any material degree of strain and accordingly have little tendency to move or to loosen from applied fastening position. This coupled with the fact that the clips may be locked in fastening position by frictional engagement with the retainer element ensures a permanent installation of the members and with little likelihood that the same will become loose or disassociated from assembled relation. When, however, the disassembly of the parts is for any reason desired, this may be readily effected by a simple turning movement of the clip to the position in which the leg elements thereof are out of contact with the base flanges of the molding and in position to be withdrawn through the opening in the supporting member.

From the foregoing it will be apparent to those skilled in the art, that, in the general combination shown, other forms of rotary clips, U-shaped clips and similar securing devices may be employed without departing from the teachings of essential characteristics thereof. However, it has been found that the specific form of clip shown in Fig. 5 is particularly effective and has many advantages over other well known forms of rotary clip devices and mainly because it may be much more economically constructed from a small section of strip metal of uniform width and without loss or waste of material whatsoever. Thus, as shown in Fig. 5, to provide the clip 30 comprising hook elements 31, 32, an inexpensive strip of metal is bent back upon itself at either end of an intermediate base portion 34 in laterally offset relation thereto to provide substantially oppositely extending yieldable head elements 35, 36 disposed at the top face of said body portion 34; the said yieldable head elements 35, 36 are further bent to provide leg portions 37, 38 which, due to the laterally offset relation of the head elements, are so disposed as to contact the longitudinal edges of the body portion 34 with the hook elements 31, 32, formed from the extremities of said leg portions, projecting from the underface of said body portion 34. When such a device is rotated into an aperture for securing superposed parts, the body portion is readily seated on the accessible part and the said contact of the leg members with the longitudinal edges of the body portion supports the same against any torsional strain or distortion which takes place in the turning operation and which would tend to make the leg members inefficient in fastening position. Also, by reason of this construction in which the head sections 35, 36 of the clip extend along the top face of the body portion 34 and in spaced relation thereto, any undue strain which must necessarily take place due to the camming action of the cam surfaces of the hook elements 31, 32, drawing the leg portions 37, 38 axially, is readily compensated for by the said yieldable head elements 35, 36 thereby permitting the clip to be readily seated in most effective applied position rigidly securing the superposed parts.

Figs. 6 and 7 show a further embodiment of the invention in which a retainer element is utilized to provide rigid engagement of superposed members secured by a rotary clip and otherwise subject to possible shifting or relative movement in an installation. As shown in Fig. 6, the accessible member 40 is provided with retainer element 41 designed for cooperative engagement in assembled relation with the side walls of an elongated opening 44 provided in a lower or inaccessible member 43, thereby preventing lateral displacement or relative shifting movement of the assembled members in any direction. Thus, the retainer element 41 carried by member 40, is adapted to project beyond the associated lower member 43 thereby presenting elongated slots or spaces 42 through which the rotary clip securing means may be applied from the accessible side of the installation and rotated to locked fastening engagement. It will therefore be seen that the application of the clip in this embodiment otherwise is substantially similar to that described with reference to the form of the invention represented in Figs. 1–4 inclusive. Accordingly, the rotary clip 30 may be applied to the superposed assembled members 40, 43 with the hook elements 31, 32 of the securing clip in operative position on the retainer element 41 and the leading cam edges thereof disposed in the elongated spaces 42 intermediate the retainer 41 and the adjacent face of the lower member 43. Upon rotation of the clip to fastening position as shown in Figs. 6 and 7, the cam surfaces of the hook elements 31, 32 clamp the superposed members 40, 43 with progressively increasing force in a substantial screw-tightening action. If desired, the retainer 41 may be designed for frictional engagement with the hook elements 31, 32 of the clip member in final applied position as best seen in Fig. 7, thereby locking the clip in such position against loosening or displacement incident to vibration, jarring and strain.

Figs. 8 and 9 disclose another embodiment of the invention in which the retainer means struck and formed from a supporting member is utilized to rigidify and anchor an installation comprising a member including an initially plastic part such as a rubber mat or tread. In this form of the invention the supporting member 50 is provided with a retainer 51 struck and formed therefrom in the usual manner. The member to be secured thereto comprises a metallic member 55 which may be of an area corresponding to that of the plastic part 57 to serve as a base therefor, or comprise individual plate-like members united to the plastic part at selected points. Preferably, the member 55 is united to the said plastic part 57 by striking and forming a retainer 56 therefrom to present an opening 59 therein of such size as to snugly receive the retainer 51 provided in the supporting member 50. Thus the retainer 56 of member 55 is adapted to serve as a concealed reinforcing means by which the material of the plastic part 57 may be united thereto in the molding operation. In the said molding operation, suitable mold forms are employed whereby the plastic material is molded in and around the retainer 56, as shown, making due provision for an enlarged cavity 58, Fig. 8, into which the cooperating retainer 51 of the supporting member 50 may be seated and the clip member applied and rotated to fastening position. Accordingly, in such an installation with the supporting member 50 provided with a retainer 51 in the usual manner, the member to be secured, comprising base member 55 and plastic part 57 is assembled therewith, with the retainer 51 snugly received in the opening 59, from which the retainer 56 has been formed. Thus, by means of the cooperating retainer elements 51, 56 the respective parts are held against displacement or lateral shifting movement and may be rigidly secured in an installation as by spring clip means 30 in the manner described above with reference to the embodiment of Figs. 1–4 inclusive, and, if desired, with the retainer 51 having locking frictional engagement with the hook elements 31, 32 of the clip in applied fastening position substantially as shown in Fig. 9.

While this invention has been described in detail with specific examples such examples are illustrative only, since it will be apparent to those skilled in the art that other modifications within the spirit and scope of the invention may be constructed without departing from the teachings or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. A spring fastener comprising a strip of metal bent intermediate its ends to provide a base and spaced holding elements projecting therefrom, each of said holding elements comprising a section of the strip bent back upon one side of said base to provide yieldable head elements carrying leg members, said leg members extending to the opposite side of said base of the fastener and having bends providing hook elements extending in opposite directions.

2. A spring fastener comprising a strip of metal bent intermediate its ends to provide a base and spaced holding elements projecting therefrom, each said holding elements comprising a section of the strip bent back upon one side of said base to provide yieldable head elements, said head elements being bent to provide leg members extending to the opposite side of said base of the fastener, said leg members having bends providing hook elements extending in opposite directions.

3. A spring fastener comprising a strip of metal bent intermediate its ends to provide a base and holding elements projecting therefrom, each said holding element comprising a section of the strip bent back upon one side of said base to provide head elements yieldable relative thereto, said head elements being bent laterally at an angle to said base and carrying leg members projecting to the opposite side thereof, said leg members having bends providing substantial hook elements extending in opposite directions.

4. A spring fastener comprising a strip of metal bent intermediate its ends to provide a base and holding elements projecting therefrom, each said holding elements comprising a section of the strip bent back upon one side of said base to provide head elements yieldable relative thereto, said head elements being bent laterally at an angle to said base and carrying leg members projecting to the opposite side thereof, said leg members having bends providing substantial hook elements extending in opposite directions, said hook elements being twisted at an angle to said base for substantial cam fastening engagement therewith.

5. A spring fastener designed to be rotated into position securing superposed members having aligned openings, said fastener comprising a strip of metal bent intermediate its ends to provide a base and holding elements projecting therefrom, each said holding elements comprising a section of the strip bent back upon one side of said base to provide head elements yieldable relative thereto and carrying leg members projecting to the opposite side of said base of the fastener, said leg members having bends providing substantial hook elements extending in opposite directions, said hook elements being spaced from said base of the fastener when normally untensioned a distance less than the combined thickness of said superposed members whereby to secure the same under continuously effective spring tension in applied fastening position.

6. A spring fastener designed to be rotated into position securing superposed members having aligned openings, said fastener comprising a strip of metal bent intermediate its ends to provide a base and holding elements projecting therefrom, each said holding elements comprising a section of the strip bent back upon one side of said base to provide head elements yieldable relative thereto and carrying leg members projecting to the opposite side of said base of the fastener, said leg members having bends providing substantial hook elements extending in opposite directions, said hook elements being spaced from said base of the fastener when normally untensioned a distance less than the combined thickness of said superposed members and being twisted at an angle to said base of the fastener to provide substantial cam surfaces designed for securing said members in firm rigid engagement under progressively increasing force upon rotation of the fastener to applied fastening position.

GEORGE A. TINNERMAN.